United States Patent [19]

White

[11] 4,223,261

[45] Sep. 16, 1980

[54] MULTI-PHASE SYNCHRONOUS MACHINE SYSTEM

[75] Inventor: Kevin E. White, Washington Township, Warren County, N.J.

[73] Assignee: Exxon Research & Engineering Co., Florham Park, N.J.

[21] Appl. No.: 936,016

[22] Filed: Aug. 23, 1978

[51] Int. Cl.² .............................................. H02P 7/44
[52] U.S. Cl. .................................... 318/721; 318/722; 318/723; 318/313; 318/314
[58] Field of Search .............................. 318/721–723, 318/313, 314

[56] References Cited

U.S. PATENT DOCUMENTS

| | | | |
|---|---|---|---|
| 2,780,668 | 2/1957 | Farr et al. | 318/778 |
| 3,307,092 | 2/1967 | Trocchio | 318/722 |
| 3,609,488 | 9/1971 | Sampson et al. | 318/722 |
| 3,611,096 | 10/1971 | Sadashige | 318/314 |
| 3,612,970 | 10/1971 | Sofan | 318/721 |
| 3,819,992 | 6/1974 | Opal et al. | 318/722 |
| 4,012,679 | 3/1977 | Matsuda et al. | 318/713 |
| 4,027,213 | 5/1977 | Valroger | 318/723 |
| 4,115,726 | 9/1978 | Patterson et al. | 318/722 |
| 4,158,800 | 6/1979 | Jahezka et al. | 318/313 X |
| 4,160,939 | 7/1979 | Damouth et al. | 318/723 |

FOREIGN PATENT DOCUMENTS

2144180  3/1972  Fed. Rep. of Germany .......... 318/721

Primary Examiner—Gene Z. Rubinson
Attorney, Agent, or Firm—Allan M. Lowe; Kenneth Watov

[57] ABSTRACT

A control system for a multi-phase synchronous machine having a shaft driven at variable speed or for developing a variable torque angle includes shaft angular position detectors that derive first and second output pulses respectively representing a shaft angular displacement corresponding with each pole of the machine and a predetermined shaft angular displacement within each pole. In response to a plurality of the second output pulses, a frequency locked loop derives a variable frequency pulse output. Individual pulses are selectively inserted and deleted from the variable frequency output to derive a variable phase pulse output representing machine torque angle. A triangle up/down counter responds to the variable phase output to derive a pulse output signal having a frequency that is a submultiple of the variable frequency output and a phase determined by the phase of the variable phase output. The time position of pulses of the first output and the up/down counter are compared to control the insertion and deletion of the individual pulses. Each phase of the machine is driven in response to the output signal of the triangle up/down counter.

13 Claims, 5 Drawing Figures

MULTI-PHASE SYNCHRONOUS MACHINE SYSTEM

TECHNICAL FIELD

The present invention relates generally to multi-phase synchronous machine systems and more particularly to a system wherein an indication of machine torque angle is derived in response to a shaft angular displacement corresponding with each pole of the machine and predetermined shaft angular displacements within each pole.

BACKGROUND ART

For certain applications, such as continuous, proportional controllers, it is desirable to operate a multi-pole, multi-phase synchronous machine, such as a synchronous motor, at variable speed of variable torque angle. It is important to control torque angle in applications wherein efficiency and power factor are maximized. (In the present specification and claims, the term "torque angle" is the electrical angle between the voltage applied to a terminal of the machine, referenced to neutral, and a voltage generated internally by the machine. If the machine is a multi-phase, wye connected motor, the torque angle is the angle between the applied motor terminal voltage and neutral and the internally generated, back EMF of the motor caused by the field winding.) Speed control of such a synchronous motor is important in applications relating to electrically powered vehicles, variable speed compressors and fans.

Numerous systems have been developed to control the speed or torque angle of a synchronous motor. Recently, these systems have employed pulse techniques and frequency locked loops wherein a voltage controlled oscillator is responsive to pulses representing the angular displacement of a synchronous motor shaft. These systems, however, have frequently encountered problems in maintaining synchronism under transient conditions, caused either by a change in load, or a change in speed or torque angle set point. The transient conditions may cause the machine to "slip a pole". Pole slipping is a phenomenon wherein the transient causes a displacement of the motor shaft by an angle commensurate with the angular displacement of one pole of the motor. If a pole slip does occur, the prior art circuits have generally not included any compensating provision. Instead, the motor shaft has generally remained out of synchronism.

It is, accordingly, an object of the present invention to provide a new and improved control system for a multi-phase synchronous machine.

Another object of the invention is to provide a new and improved system for controlling the speed of a multi-phase synchronous machine.

A further object of the invention is to provide a new and improved system for controlling torque angle of a multi-phase synchronous machine.

A further object of the invention is to provide a new and improved circuit for maintaining a multi-phase synchronous motor in synchronism with a power source under transient conditions.

An additional object of the invention is to provide a new and improved multi-phase synchronous machine system for deriving an output indicative of machine torque angle.

An additional object of the invention is to provide a new and improved pulse-type system for a multi-phase synchronous machine adapted to be driven at a variable output speed or to have a variable torque angle wherein synchronism of the machine is maintained under transient conditions.

DISCLOSURE OF INVENTION

In accordance with one aspect of the invention, a system for multi-phase synchronous machine having a shaft adapted to be driven at a variable output speed or a variable torque angle includes shaft angular position detector means for deriving a first output signal for a shaft angular displacement corresponding with each pole of the machine and for deriving a second output for a predetermined shaft angular displacement within each pole. A frequency locked loop responsive to the second output derives a variable output frequency, determined by the frequency of the second output.

In response to the variable output frequency and the first output from which a machine torque angle indicating signal is derived, one cycle from the variable output frequency is selectively inserted or deleted. The cycle is inserted and deleted in response to the torque angle indicating signal and a predetermined torque angle set point, whereby one cycle is inserted into the variable frequency output in response to a torque angle increase as indicated by the torque angle indicating signal being greater than the torque angle set point. One cycle is deleted from the variable frequency output in response to a torque angle decrease, as indicated by the torque angle indicating signal being less than the torque angle set point. For torque angle control, the torque angle set point is set to a single predetermined value, which may be fixed or variable. For shaft speed control, the torque angle set point is actually two set points, one for maximum torque angle increase, and the other for maximum torque angle decrease. The theoretical maximum torque angle increase and decrease are respectively $+90°$ and $-90°$.

In the preferred embodiment, the signals representing shaft angular displacement are pulse signals and the variable frequency output is a pulse output derived from a voltage controlled oscillator responsive to an error signal indicative of the deviation between the output frequency and the repetition rate of the second output pulses. Pulses from the voltage controlled oscillator are selectively inserted and deleted from the variable frequency output in response to the derived torque angle indicating signal.

In this preferred embodiment, the first output pulses are compared with pulses derived from a triangle up/down counter driven by the voltage controlled oscillator pulses. The triangle up/down counter is arranged so that it is incremented in response to a predetermined number of the voltage controlled oscillator pulses and is then decremented in response to the predetermined number of the voltage controlled oscillator pulses. A binary comparator compares the value of a multi-bit, parallel output of the triangle up/down counter with a predetermined binary value to derive pulses that are compared in time position with the first output pulses. The relative time position indicates whether or not pulses are to be inserted into or deleted from the variable frequency output.

Each phase of the machine is driven by a separate pseudo sine wave source; each of the waves is displaced by $360°/K$, where K is the number of phases, except when $K=2$ which requires a $90°$ phase displacement.

Each of the pseudo sine waves is preferably formed of a rectangular wave notched to approximate a sine wave, as disclosed in the copending, commonly assigned application Ser. No. 846,696, entitled "Synthesizer Circuit for Generating Three-Tier Waveforms", filed Oct. 31, 1977, in the name of Richard H. Baker now U.S. Pat. No. 4,135,235. Each of the pseudo sine wave sources includes a digital, triangle to sine wave weighting generator responsive to the output signal of the triangle up/down counter. An output signal of each digital triangle to sine wave weighting generator is applied to a separate digital to analog converter which derives a sine wave reference signal that is applied, in a preferred embodiment, to a network similar to FIG. 10 of Ser. No. 846,696 now U.S. Pat. No. 4,135,235.

To control the machine shaft speed or torque angle, an output of the machine commensurate with shaft speed or torque angle is compared with a speed or torque angle set point signal to derive an error signal that is applied to the voltage controlled oscillator which is also responsive to the second output. The gain of the digital to analog converters, and hence the amplitude of the pseudo sine waves applied to the machine, is also controlled in response to the amplitude of the input to the voltage controlled oscillator. The machine responds to the variable amplitude and frequency pseudo sine waves so that the shaft speed is directly proportional to the frequency applied to each phase. Because of the manner in which pulses are inserted and deleted from the output of the voltage controlled oscillator, the motor remains in synchronism with the pseudo sine waves, even during transients. In addition, the tendency for the motor to "slip a pole" is prevented by the torque angle control circuit.

In accordance with a further feature of the invention, the frequency division factor (N4) of a frequency divider in a feedback loop of the frequency lock loop is related to the number of second pulses (N3) derived for each complete revolution of the shaft, the number of poles (P) of the machine, the number (N1) of phases of the machine, and the number of pulses (TB) required to reverse the triangular counter in accordance with: 216 (TB)=P(N3)(N4)(N1). It has been found that this relationship enables synchronism to be maintained.

The above and still further objects, features and advantages of the present invention will become apparent upon consideration of the following detailed description of several specific embodiments thereof, especially when taken in conjunction with the accompanying drawing.

BEST MODE FOR CARRYING OUT THE INVENTION

Figure 1:
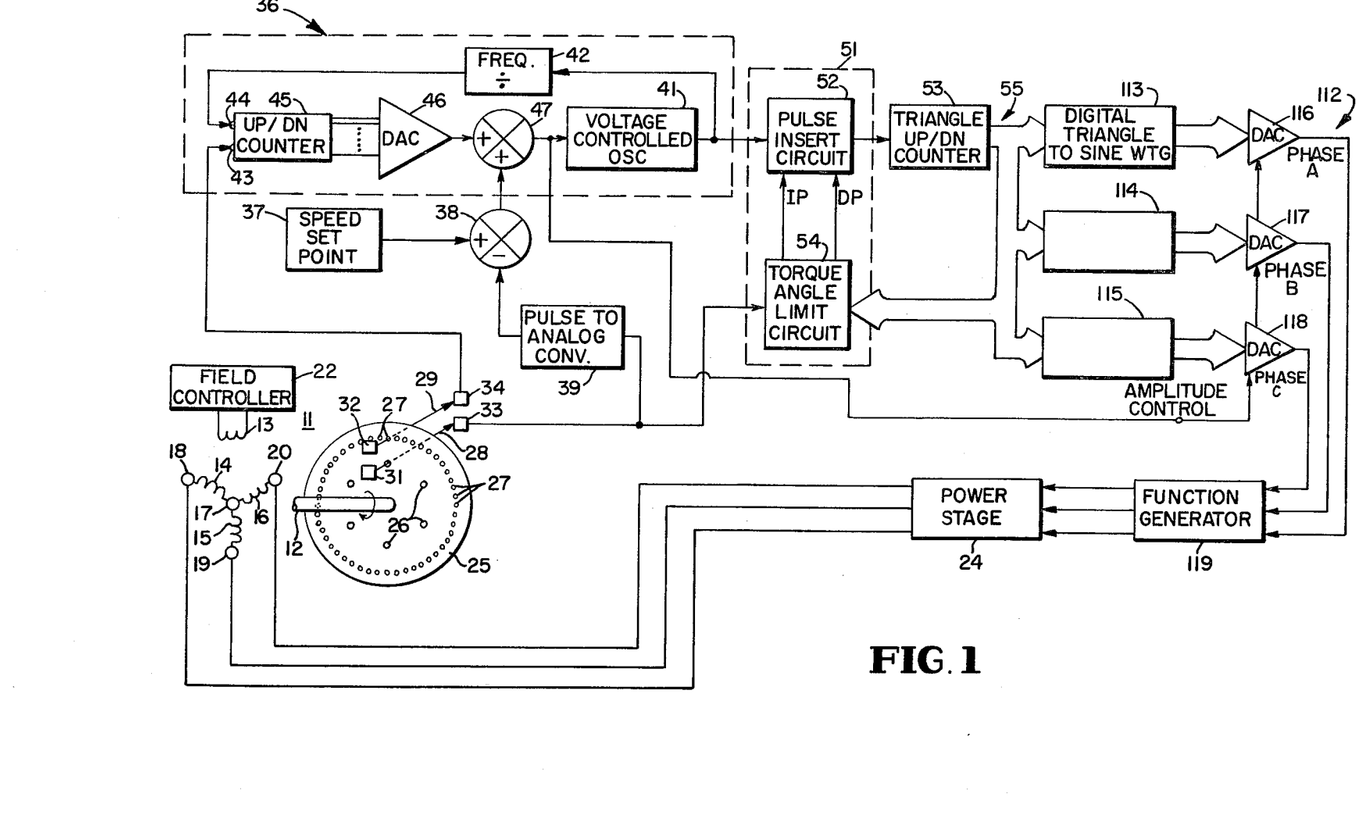
FIG. 1 is a block diagram of a preferred embodiment of the invention.

Reference is now made to FIG. 1 of the drawing wherein there is illustrated a multi-phase, multi-pole synchronous machine in the form of synchronous motor 11 including output shaft 12, field winding 13 and three wye-connected armature windings 14, 15 and 16, having a common or neutral terminal 17 and output terminals 18, 19 and 20, respectively; motor 11 is a three phase, six pole machine in the illustrated embodiment. Field winding 13 is supplied with a current by field controller 22. The current supplied by controller 22 to winding 13 can be a constant current for certain applications, or a variable current for other applications, or a variable current for other applications wherein approximately unity power factor is desired. Because both types of field controllers are known to those skilled in the art, no detailed description of field controller 22 is given.

Armature windings 14–16 are driven by three phase pseudo sine wave voltages supplied to terminals 18, 19 and 20 by three phase power stage 24; in a preferred embodiment, stage 24 is of the type illustrated in FIG. 10 of Ser. No. 846,696 now U.S. Pat. No. 4,135,235. Each pseudo sine wave voltage supplied by power stage 24 to terminals 18–20 is formed of rectangular waves notched to approximate sine waves. In the preferred embodiment, the rectangular waves are combined to form a three tier waveform having no constant values on the average value for the pseudo sine wave. The pseudo sine waves are filtered by windings 14–16 and motor 11 so that effectively sine wave fluxes are derived from the currents in the armature windings. It is to be understood, however, that other types of power sources could be utilized to drive windings 14–16, and in particular, the voltage applied to the windings could be a pure sine wave or other types of pseudo sine waves.

To control the speed of shaft 12 or the torque angle of machine 11, i.e., the electrical angle between the voltage applied between any terminals 18–20 and neutral terminal 17 relative to the back EMF generated by motor 11, the motor includes shaft angular position detector means for deriving a first output for a shaft angular displacement corresponding with each pole of the machine and for deriving a second output for a predetermined shaft angular displacement within each pole.

To these ends, fixedly mounted on shaft 12 is a circular code disc 25, including a first set of apertures 26 and a second set of apertures 27, which enable the first and second outputs to be respectively derived. The apertures in sets 26 and 27 are equally spaced about disc 25 so that the number of apertures in set 26 is equal to the number of poles of motor 11, and the number of apertures in set 27 is established by a mathematical criterion to be discussed infra. For the particular embodiment wherein motor 11 is a three phase, six pole machine, six apertures are included in set 26, while 48 apertures (8 for each pole) are included in set 27. To detect the rotation of shaft 12, light beams 28 and 29 are selectively passed through the apertures of sets 26 and 27, from lamps 31 and 32 to optical detectors 33 and 34, respectively. Thereby, detectors 33 derives a pulse output each time one of the apertures in set 26 allows beam 28 to impinge on the detector, while detector 34 derives an output pulse each time an aperture in set 27 allows beam 29 to impinge on detector 34. Each of the apertures in set 26 is aligned with one of the apertures in set 27, so that there is an integral number of apertures in set 27 between each of apertures 26. For one complete, 360° turn of shaft 12, detectors 33 and 34 respectively derive six and 48 output pulses.

The output pulses from detector 34 are supplied to a frequency lock loop 36 which derives a variable frequency, pulse output, having a frequency determined by the frequency of the pulses derived by detector 34. In addition, frequency lock loop 36 is responsive to DC source 37 which derives a set point signal for either the speed of shaft 12 or the torque angle of machine 11. The set point signal derived from source 37 is compared in subtraction network 38 with a DC signal representing a parameter of machine 11; network 38 derives an error signal representing the polarity and difference magnitude between the set point value and a monitored parameter of machine 11. If the monitored parameter is torque angle, an appropriate transducer (not shown) is provided and supplies a signal to an input of difference network 38. For speed control of shaft 12, a pulse to analog converter network 39 responds to the pulses derived from detector 33, to derive a DC signal that is supplied to difference network 38. The error signal from difference network 38 is combined with the output signal of detector 34 so that frequency lock loop 36 derives a variable output frequency that, under most operating conditions, maintains shaft 12 at a speed commensurate with the value of the set point signal derived from source 37.

Frequency lock loop 36 includes a voltage controlled oscillator 41 that derives a pulse output having a variable frequency determined by the voltage applied to the input of the oscillator. The output of oscillator 41 is combined with the output of detector 34 to maintain the speed of shaft 12 or torque angle of motor 11 at the set point value established by source 37. The feedback circuit which enables oscillator 41 to be synchronized with the output of detector 34 includes a frequency division network 42, responsive to the output of oscillator 41. Frequency division network 42 has a suitable frequency division factor, established by the same criterion as is utilized to establish the number of apertures in set 27; for one particular application, the frequency division factor of frequency divider 42 is three. The outputs of detector 34 and frequency divider 42 are respectively applied to up and down terminals 43 and 44 of up/down counter 45. Counter 45 includes a multi-bit, parallel output which is supplied to digital-to-analog converter 46. Digital-to-analog converter 46 thereby derives a DC voltage having a polarity and magnitude indicative of a tracking error between the output of oscillator 41 and the number of pulses derived from detector 34. The analog output of converter 46 is combined with the DC output of difference network 38, in summing network 47, having a DC output voltage which is applied as a frequency control input to voltage controlled oscillator 41.

The variable frequency output of frequency lock loop 36 is applied to a phase controlled frequency circuit 51 including pulse insert/delete circuit 52 for selectively inserting or deleting one pulse or cycle into or out of the output of the frequency lock loop. The output of circuit 52 is controlled by circuit 54 which derives a signal indicative of the machine torque angle. Circuit 52 inserts one cycle or pulse into the variable frequency output of frequency lock loop 36 in response to machine 11 having a torque angle greater than a torque angle set point. One cycle is deleted from the output of frequency lock loop 36 by circuit 52 in response to machine 11 having a torque angle decrease less than the torque angle set point. Normally, circuit 52 does not either insert or delete pulses or cycles from the output of frequency lock loop 36, but it selectively inserts and deletes pulses in response to transients in the system which would otherwise result in pole slipping of machine 11. The transients can be caused by a change in the speed or torque angle set point or because of load changes on shaft 12.

If the system is utilized for speed control, the torque angle set point utilized to control insertion and deletion of pulses by circuit 52 is actually two set points. One of the set points is for maximum torque angle increase, while the other set point is for maximum torque decrease. The theoretical maximum torque angle increase and decrease are respectively $+90°$ and $-90°$, although in a practical system, these angles are reduced generally to about $\pm(80°-85)°$. For torque angle control, the torque angle set point utilized to control the insertion and deletion of pulses by circuit 52 in a single predetermined value; if there is a deviation from this value, individual pulses are inserted and deleted by circuit 52 on the output of frequency lock loop 36.

To insert and delete pulses, circuit 52 is responsive to the output of detector 33 and a feedback signal derived by triangle up/down counter 53. The signals from counter 53 and detector 33 are combined in torque angle limit circuit 54 which derives output signals IP and DP which respectively command insertion and deletion of pulses by circuit 52 on the output of frequency lock loop 36.

Triangle up/down counter 53 is a conventional integrated circuit component that includes a parallel, multi-bit output bus 55, as well as internal circuitry to command the counter to switch from counting in the up direction (incrementing) to counting in the down direction (decrementing) in response to a predetermined number of pulses being applied to the counter. In one particular embodiment, counter 53 switches between its up and down binary counting states in response to twelve successive pulses supplied to it by circuit 52.

The magnitude of the multi-bit, parallel output of counter 53, on bus 55, represents the machine torque angle at the time a pulse is derived from detector 33 and is compared in torque angle limit circuit 54 with a multi-bit, parallel signal representing the maximum torque angle. When the machine torque angle, as derived from the output of counter 53, is less than the maximum torque angle, compartor 54 derives an output signal that is generally a sub-multiple of the variable frequency output of circuit 52 and compares it in time position with the output signal of detector 33. In response to the time position being the same, as usually occurs, circuit 54 applies no signal to circuit 52 and the output of frequency lock loop 36 passes undisturbed through circuit 52 to counter 53. If, however, the time position is not the same, a pulse is inserted or deleted from the output of frequency lock loop 36 as appropriate. When machine 11 appears to function as a generator due to its torque angle being greater than the maximum increase, circuit 54 supplies an input to circuit 52 on line IP, whereby circuit 52 inserts a pulse into the output of frequency lock loop 36. In an opposite manner, if machine 11 is functioning as a motor, whereby the output of detector 33 does not occur in time position with the comparison output derived from circuit 54 in response to the output of counter 53, circuit 54 supplies circuit 52 with a signal on lead DP, whereby a pulse is deleted by circuit 52 on the signal supplied by frequency lock loop 36 to counter 53.

Figure 2:
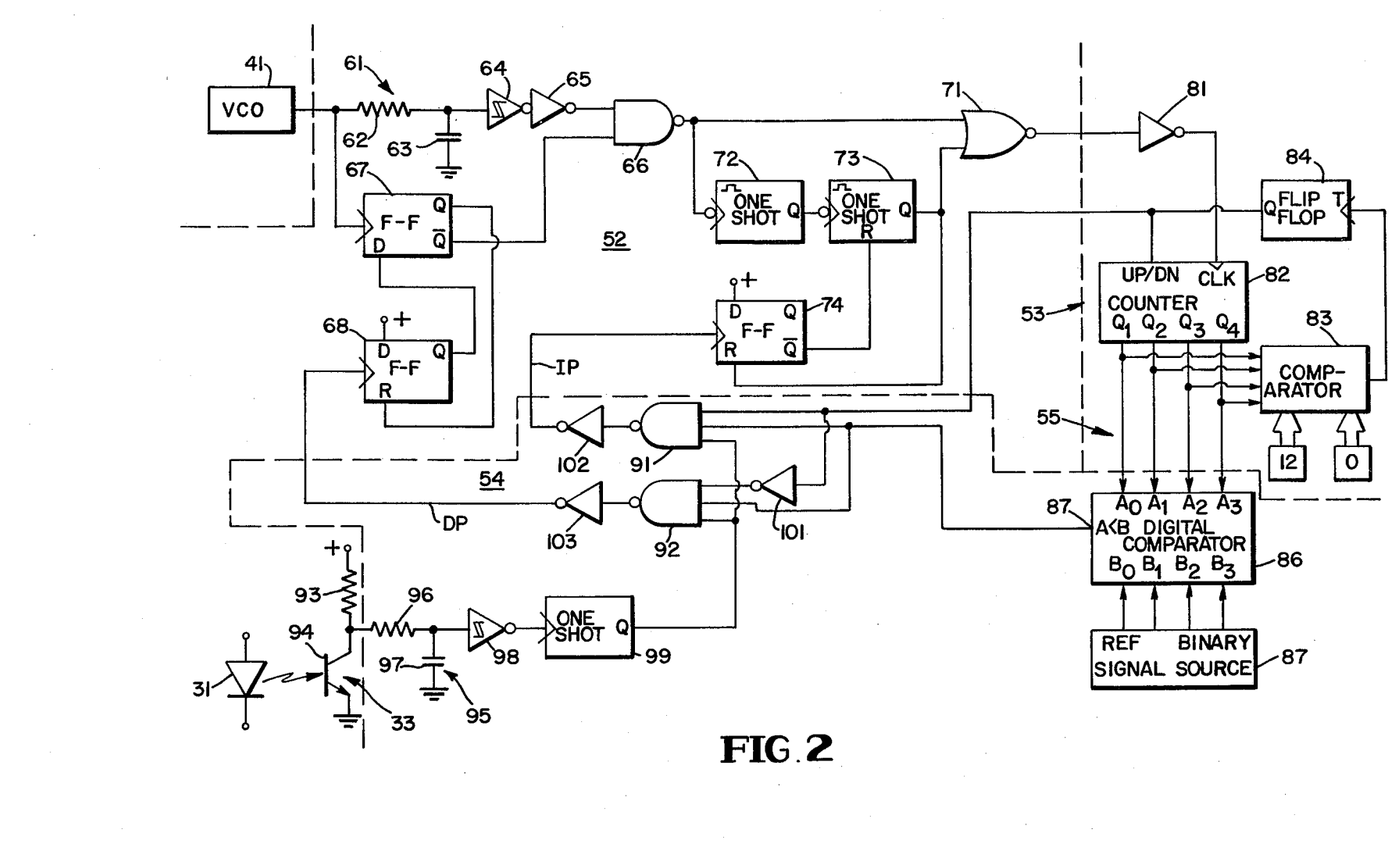
FIG. 2 is a circuit diagram of a portion of the system illustrated in FIG. 1.

Details of the circuitry included in phase controlled frequency circuit 51 and triangle up/down counter 53 are schematically illustrated in FIG. 2. Output pulses of voltage controlled oscillator 41 are applied to a 12 microsecond delay network 61, including series resistor 62 and shunt capacitor 63. Delay network 61 is provided so that output pulses of oscillator 41 which are to be deleted are not passed through the remaining gating circuit prior to the occurrence of command signals for the deletion of the oscillator output. The output of delay network 61 is applied to an inverting, hysteresis amplifier 64 which drives inverter 65, having a bilevel, pulse output applied to one input of NAND gate 66.

NAND gate 66 is selectively activated to delete an individual pulse from the output of inverter 65. Control for selective deletion of pulses from the output of inverter 65 by NAND gate 66 is provided by the $\bar{Q}$ output of D flip-flop 67, having a trigger input responsive to the output of voltage controlled oscillator 41. Flip-flop 67 includes a D input terminal responsive to a Q output of D flip-flop 68, having a reset (R) input responsive to the Q output of flip-flop 67. A trigger input of flip-flop 68 is responsive to a command pulse that is selectively applied to lead DP, in a manner described infra.

The output of NAND gate 66 is fed to NOR gate 71 which selectively inserts or adds a pulse to the output of NAND gate 66, under the control of one shots 72 and 73, as well as D flip-flop 74. One Shot 72 includes an inverting trigger input responsive to the output of NAND gate 66, as well as a Q output that is applied to an inverting, trigger input of one shot 73. One shot 73 includes a Q output that is supplied in parallel to one input of NOR gate 71 and a reset (R) input of D flip-flop 74. D flip-flop 74 includes a positively biased D input terminal, as well as a $\bar{Q}$ output that is applied to an R input terminal of one shot 73. D flip-flop 74 also includes a trigger input responsive to a pulse on lead IP, as derived by circuit 54. Hence, NAND gate 66 and NOR gate 71, as well as the flip-flops and delay circuit associated therewith, comprise pulse insert/delete circuit 52, FIG. 1.

The pulse output of circuit 52, as derived from the output of NOR gate 71, is applied to inverting amplifier 81 of triangle up/down counter 53, which also includes up/down counter 82, comparator 83 and D flip-flop 84. Output pulses from inverter 81 are applied to a clock input terminal of counter 82, a four stage binary counter having a four bit parallel output signal at terminals Q1–Q4. The output signal at terminals Q1–Q4 is applied to comparator 83 which derives an output signal in response to the count at terminals Q1–Q4 being commensurate either with the decimal number 0 or 12, i.e., comparator 83 derives a binary one output in response to counter 82 deriving an output signal 0000 or 1100. The output of comparator 83 is applied to a trigger input of toggle (T) flip-flop 84, having a Q output applied to up/down input terminal of counter 82. In response to a binary one signal at the Q output of flip-flop 84, counter 82 is activated so that it counts pulses supplied to the clock input thereof in an incrementing manner, while a binary zero input to the up/down input of counter 82 results in each pulse at the clock input of counter 82 decrementing the counter contents. Because of the 0000 and 1100 references applied to comparator 83, counter 82 thereby counts 12 pulses from inverter 81 in an upward direction and counts the following 12 pulses from inverter 81 in the downward direction.

The signal at the Q1–Q4 output terminals of counter 82 are the signals on bus 55; this signal is applied to the input of torque angle limit circuit 54. In circuit 54, the signal on bus 55 is compared, in binary comparator 86, with a signal representing desired torque angle of machine 11, as applied to terminals B0–B3 by a reference binary signal source 87. Comparator 86 includes input terminals A0–A3 to which the signals derived at terminals Q1–Q4 are respectively applied. Comparator 86 includes an output terminal 89 on which is derived a binary one level in response to the binary value at terminals A0–A3 being less than the binary value of the signal at terminals B0–B3.

The signal derived on lead 89 is compared in time position with the leading edge of pulses derived by detector 33. The time position comparison circuit includes NAND gates 91 and 92, driven in parallel by the output signal of comparator 86 on lead 89, as well as a shaped pulse derived from detector 33. The shaped pulse derived from detector 33 is derived across collector load resistor 93 of NPN, optically responsive transistor 94. The voltage developed across load resistor 93 is applied to a noise smoothing filter circuit 95 including series resistor 96 and shunt capacitor 97. The voltage developed across capacitor 97 is supplied to an input of inverting, hysteresis amplifier 98, having an output that drives a trigger input of one shot 99. One shot 99 includes a Q output terminal on which is derived a very short duration pulse, the leading edge of which is compared with the signal on lead 89 to control the derivation of pulses on leads DP and IP.

NAND gates 91 and 92, in addition to being responsive to the signals on lead 89 and at the Q output of one shot 99, are responsive to the output signal of T flip-flop 84, as applied to the up/down input of counter 82. The input of NAND gate 91 is directly responsive to the Q output of flip-flop 84, while the input of NAND gate 92 is responsive to an inverted replica of the state of flip-flop 84, as supplied to the NAND gate by inverter 101, that is connected to the Q output of flip-flop 84. Each of NAND gates 91 and 92 includes a separate output terminal respectively connected to inverters 102 and 103; on the outputs of the inverters are derived the IP and DP pulses that are respectively applied to the trigger input terminals of D flip-flops 74 and 68.

Inverter 102 derives an add or insert pulse in response to binary ones being simultaneously derived from the Q output of flip-flop 84, on lead 89, and at the Q output of one shot 99. The binary one output of inverter 102 is thereby derived only while counter 82 is being driven in the forward direction and when the magnitude of the binary signal applied to terminals A0–A3 of comparator 86 is less than the value of the signal applied by source 87 to terminals B0–B3 of the comparator. For control of the speed of shaft 12, the inputs of terminals B0–B3 of comparator 86 are set to correspond to the maximum torque angle of approximately 80°. A binary one output signal is derived from inverter 103 only in response to a binary zero being derived from the Q output of flip-flop 84 while binary one signals are derived by comparator 86 on lead 89 and a binary one output is derived from one shot 99. Hence, the binary one output can be derived from inverter 103 only while counter 82 is being decremented and a binary one output is derived from one shot 99 while the count of counter 82 is less than the reference binary magnitude inserted into source 87.

If the circuit is utilized to control torque angle, rather than shaft speed, the magnitude of the values supplied to terminals B0–B3 by reference source 87 would be commensurate with the desired torque angle and additional circuitry would be added to modify the insert or delete pulse logic. For example, if it were desired to maintain a torque angle at 45° decrease, the binary value of source 87 would be adjusted to be commensurate with the 41.25° to 48.75° torque angle range. (This 7.5° range, 90°/12, is a consequence of the 12 steps counter 82 requires for count reversal). When counter 82 is decrementing and the leading edge of pulses derived by detector 33 occur, a binary one is derived on lead DP if the output counter 82 is less than the reference binary signal source 87 count; a binary one is derived on lead IP if the output of counter 82 is greater than the output of reference source 87; a binary one is derived on neither lead IP nor lead DP if the outputs of counter 82 and source 87 are equal. Whenever counter 82 is incrementing and an edge pulse from detector 33 occurs, a binary one is derived on lead IP since a torque angle decrease is desired. Such circuitry to achieve these logic functions is well known to those skilled in the art.

Figure 3:
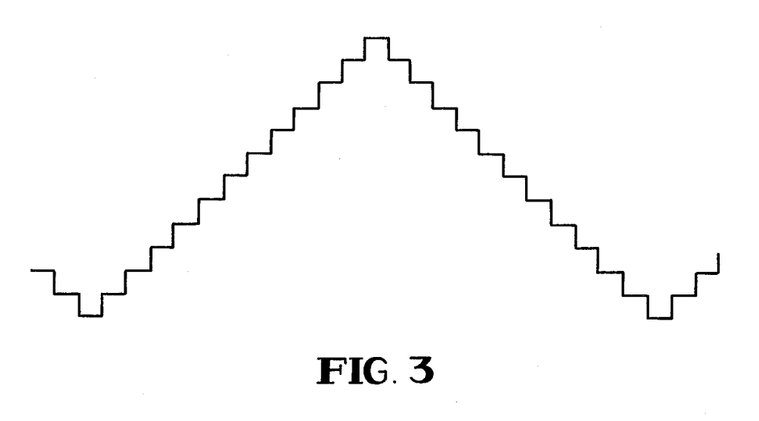
FIG. 3 is a waveform useful in describing the operation of the system of FIG. 1.

The magnitude of the output of triangle up/down counter 53 and of counter 82, on buss 55, can be represented as a series of steps, as illustrated in FIG. 3. The magnitude of the counter increases in 12 steps for an initial (180/P)° rotation of shaft 12, where P is the number of machine poles. The 12 ascending steps are followed by 12 descending steps, which occur during the next (180/P)° of rotation of shaft 12. The ascending and descending step sequences are repeated during each (180/P)° turn of shaft 12, except when circuit 52 inserts or deletes a pulse derived from the output of frequency lock loop 36. The magnitude of the FIG. 3 waveform at the time a pulse is derived from detector 33 represents the machine torque angle. If the waveform has a peak output while detector 33 derives an output, the machine torque angle is 0°. The minimum waveform values to the left and right of the peak, when detector 33 derives an output, respectively represent torque angles of +90° and −90°.

The output of counter 53 on bus 55 is applied to a three phase pseudo sine wave generator 112, which derives the notched three phase pseudo sine wave applied by power stage 24 to terminals 18–20 of motor 11. Pseudo sine wave generator 112, together with up-/down counter 53 is, in one preferred embodiment, a cascaded arrangement of the networks illustrated in FIG. 5 of the commonly assigned application, U.S. Ser. No. 890,460 now U.S. Pat. No. 4,167,775, filed Mar. 27, 1978, for "Controller for Synthesizer Circuit for Generating 3-Tier Waveforms", by Baker et al, and the aforementioned circuitry included in Ser. No. 846,696 now U.S. Pat. No. 4,135,235.

Basically, the pseudo sine wave generator includes a plurality of digital triangle to sine wave weighting generators one of which is provided for each of the phases of motor 11. For the three phase situation, three weighting generators 113–115, all driven in parallel by the four bit parallel output bus 55 of counter 53, are provided. Each of weighting generators 113–115 is preferably a read only, digital memory arranged so that a multi-bit, parallel digital sine wave is derived from it in response to the triangle multi-bit signal on bus 55. The digital sine waves derived by generators 113–115 are arranged to respond to the amplitude of the signal on bus 55 so that there is a phase displacement of 360°/K between the outputs of the several generators, where K = the number of phases of motor 11; for the particular three phase device there is a 120° phase displacement between the outputs of generators 113–115. For the two phase motor case the phase displacement is 90°.

The digital sine wave signals derived from generators 113–115 are respectively applied to digital-to-analog converters 116–118. Converters 116–118 respond to the outputs of generators 113–115 to derive low power sine wave variations that include relatively small steps, which approximate a smooth sine wave. The amplitude of the sine wave output of each of converters 116–118 is controlled by changing the gain of each of the converters. To this end, each of converters 116–118 includes an amplitude control input terminal responsive to the analog input signal supplied to voltage controlled oscillator 41 by summing network 47. The amplitude control for each of digital-to-analog converters 116–118 provides identical changes in the amplitude of the output signal of each of the converters.

The phase displaced output signals of digital-to-analog converters 116–118 are applied to function generator circuit 119, illustrated in FIG. 5 of the '460 application. In function generator 119, each of the sine waves is converted into a triangular wave having a reference amplitude and a phase that is the same as the phase of the sine wave that causes derivation of the particular triangle wave. The variable amplitude sine wave is compared with the reference amplitude of the triangle wave, to derive three phase switching pulses that are applied to power stage 24. Power stage 24 includes a DC power source, and circuitry as illustrated in FIG. 10 of the '696 application. The power stage responds to the switching signals derived by function generator 119 to switch the DC power source to derive the three tier pseudo sine wave that is applied to terminals 18–20.

Figure 4A:
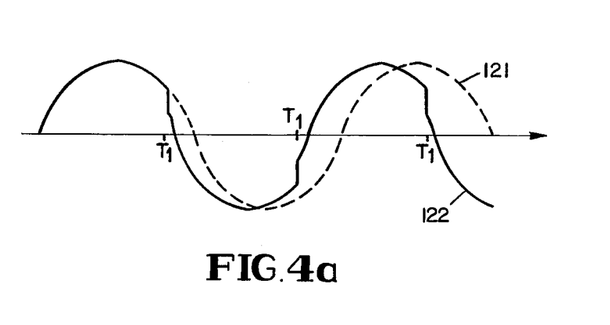
FIGS. 4a and 4b are further waveforms useful in describing the operation of the system of FIG. 1.
Figure 4B:
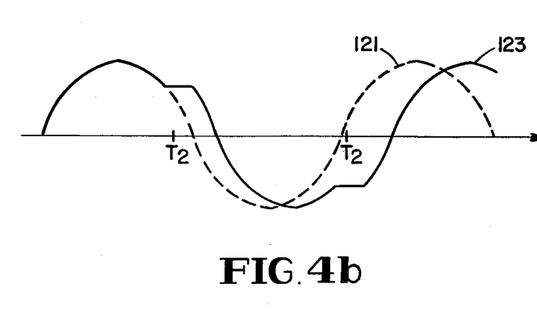

The pseudo sine wave voltage applied by power stage 24 to terminals 18–20 may approximate a sinusoid, as illustrated in FIGS. 4a and 4b. In each of FIGS. 4a and 4b, the voltage supplied to one of the terminals 18–20 of motor 11, relative to neutral terminal 17, by one of the outputs of power stage 24 under normal conditions is illustrated by sinusoidal waveform 121. When machine 11 is operating as a generator, whereby circuit 54 activates circuit 52 to insert a pulse in the output of voltage controlled oscillator 41, the sinusoidal waveform is changed, as indicated by waveform 122. A comparison of waveforms 121 and 122 reveals that initially the waveforms are identical in amplitude and phase. The pulse is inserted in approximately the last quarter of the first half cycle of the waveform applied by power stage 24 to machine 11 at time $T_1$. At time $T_1$, there is a sudden decrease in the voltage supplied by power stage 24 to machine 11. Thereafter, the essentially sine wave variation is derived from the output of power stage 24 until time $T_1$ is reached during the next half cycle of the power stage output. Pulses are continued to be inserted by circuit 52 until there has been enough "slippage" of waveform 122 relative to waveform 121 so that the machine torque angle is within the predetermined maximum torque angle setting, whereby the tendency for pole slipping which caused the original insertion has been compensated.

In FIG. 4b, waveform 123 illustrates the nature of the voltage supplied by power stage 24 to one phase of machine 11, when the machine is operating as a motor. To derive waveform 123, there is a decrease in the frequency supplied by power stage 24 to machine 11 as a result of circuit 52 deleting pulses from the output of frequency lock loop 36. The pulse deletion occurs in approximately the last quarter of each half cycle of the AC voltage, at time $T_2$. At time $T_2$, a relatively constant voltage is supplied by one output lead of power stage 24 to one input terminal of machine 11. There is thus a decrease in the frequency of waveform 123 relative to waveform 122. This decrease in frequency or slippage occurs until the machine torque angle is within the maximum torque angle setting.

It can be shown that the number of apertures (N3) in set 27, the number of poles (P) in machine 11 (equal to the number of apertures in set 26), the frequency division factor (N4) of frequency divider 42, the number of phases (N1) of machine 11, and the reversal count (TB) of triangle counter 53 are related by $(216)(TB)=(P)(N3)(N4)(N1)$. In the preferred, described embodiment, TB=12, P=6, N3=48, N1=3, and N4=3, whereby $$(216)(12)=(6)(48)(3)(3),$$

$$2592=2592.$$

While there have been described and illustrated several specific embodiments of the invention, it will be clear that variations in the details of the embodiments specifically illustrated and described may be made without departing from the true spirit and scope of the invention as defined in the appended claims.

I claim:

1. A control system for a multi-phase synchronous machine having a shaft adapted to be driven at variable output speed or a variable torque angle comprising shaft angular position detector means for deriving a first output for a shaft angular displacement corresponding with each pole of the machine and for deriving a second output for a predetermined shaft angular displacement within each pole, means responsive to the second detector for deriving a variable frequency output determined by the frequency of the second output, means for selectively inserting and deleting one cycle from the variable frequency output to derive a variable phase output, means responsive to the variable phase output for deriving an output signal having a frequency that is a sub-multiple of the variable frequency output and a phase determined by the phase of the variable phase output, means for comparing the phase of the first output and the output signal for controlling the means for inserting and deleting, and means for driving each phase of the machine in response to the output signal.

2. A system for a multi-phase synchronous machine having a shaft adapted to be driven at variable output speed or a variable torque angle comprising shaft angular position detector means for deriving a first output for a shaft angular displacement corresponding with each pole of the machine and for deriving a second output for a predetermined shaft angular displacement within each pole, means responsive to the second output for deriving a variable frequency output determined by the frequency of the second output, means responsive to the variable frequency output and the first output for selectively inserting and deleting one cycle from the variable frequency output to derive a signal indicative of the machine torque angle, said means for inserting and deleting including means responsive to the torque angle indicating signal and predetermined torque angle set point so that one cycle is inserted into the variable frequency output in response to a torque angle increase, as indicated by the torque angle indicating signal being greater than the torque angle set point, and one cycle is deleted from the variable frequency output in response to a torque angle decrease, as indicated by the torque angle indicating signal being less than the torque angle set point.

3. The system of claim 2 further including means for driving each phase of the machine in response to the torque angle indicating signal.

4. A control system for a multi-phase synchronous machine having a shaft adapted to be driven at variable output speed or a variable torque angle comprising shaft angular position detector means for deriving an output pulse for a shaft angular displacement corresponding with each pole of the machine and for deriving a second output pulse for a predetermined shaft angular displacement within each pole; means responsive to a plurality of the second output pulses for deriving a variable pulse output having a pulse repetition rate determined by the frequency of the second output pulses, means for selectively inserting and deleting individual pulses of the variable frequency output to derive a variable phase pulse output, a triangle up/down counter responsive to the variable phase output for deriving a pulse output signal having a frequency that is a sub-multiple of the variable frequency output and a phase determined by the phase of the variable phase output, means for comparing the time position of pulses of the first output and the output signal for controlling the means for inserting and deleting, and means for driving each phase of the machine in response to the output signal.

5. The system of claim 4 wherein the counter derives a multi-bit, parallel binary output for activating the driving means, and the time position comparing means includes means for comparing the value of the multi-bit parallel output with a predetermined binary value.

6. The system of claim 4 wherein the means for deriving the variable frequency output includes a feedback frequency divider having a frequency divider factor N4; the number of second pulses for each complete revolution of the shaft (N3), the number of poles (P), the value of N4, the number of phases (N1) of the machine, and the number of pulses (TB) required to reverse the triangle counter being related by: $216(TB)=(P)(N3)(N4)(N1)$.

7. The system of claim 5 wherein the means for deriving the variable frequency output includes a feedback frequency divider having a frequency divider factor N4; the number of second pulses for each complete revolution of the shaft (N3), the number of poles (P), the value of N4, the number of phases (N1) of the machine, and the number of pulses (TB) required to reverse the triangle counter being related by: $216(TB)=(P)(N3)(N4)(N1)$.

8. The system of any of claims 1, or 4, or 5, or 6, or 7, wherein the driving means includes means responsive to the output signal for deriving K pseudo sine waves, where K is the number of phases, each of the pseudo sine waves being phase displaced by 360°/K, except when K=2 the phase displacement is 90°, each of the pseudo sine waves being applied to an input terminal of a different phase of the machine, the pseudo sine waves being formed of rectangular waves notched to approximate sine waves.

9. The system of claim 8 wherein each of the pseudo sine wave deriving means includes a digital to sine wave weighting generator responsive to the output signal, a digital to analog converter responsive to the weighting generator for deriving a low power sinve wave output, and means for controlling the gain of the K converters to control the amplitude of the pseudo sinve waves applied to the input terminals.

10. The system of claim 9 wherein the variable frequency deriving means includes a voltage controlled oscillator responsive to an analog error signal having an amplitude determined by the difference between the output frequency of the oscillator and the frequency of the second pulses, and means for controlling the gain of the converters in response to the error signal amplitude.

11. The system of claim 10 further including a set point source, means responsive to the set point source and the first pulses for deriving an analog signal indicative of an error between the set point and a parameter of the machine, and means for controlling the frequency of the voltage controlled oscillator in response to the error between the set point and the machine parameter.

12. The system of claim 11 wherein the parameter is the repetition rate of the first pulses.

13. The system of any of claims 1, or 2, or 3, or 4, or 5, or 6, or 7 wherein the variable frequency deriving means includes a voltage controlled oscillator responsive to an analog error signal having an amplitude determined by the frequency difference between the output of the oscillator and the frequency of the second pulses, a set point source, means responsive to the set point source and the first pulses for deriving an analog signal indicative of an error between the set point and a parameter of the machine, and means for controlling the frequency of the voltage controlled oscillator in response to the analog signal indicating the error between the set point and the machine parameter.

* * * * *